May 27, 1930.  J. PAMPE  1,760,658
EGG TESTING DEVICE
Original Filed July 10, 1928
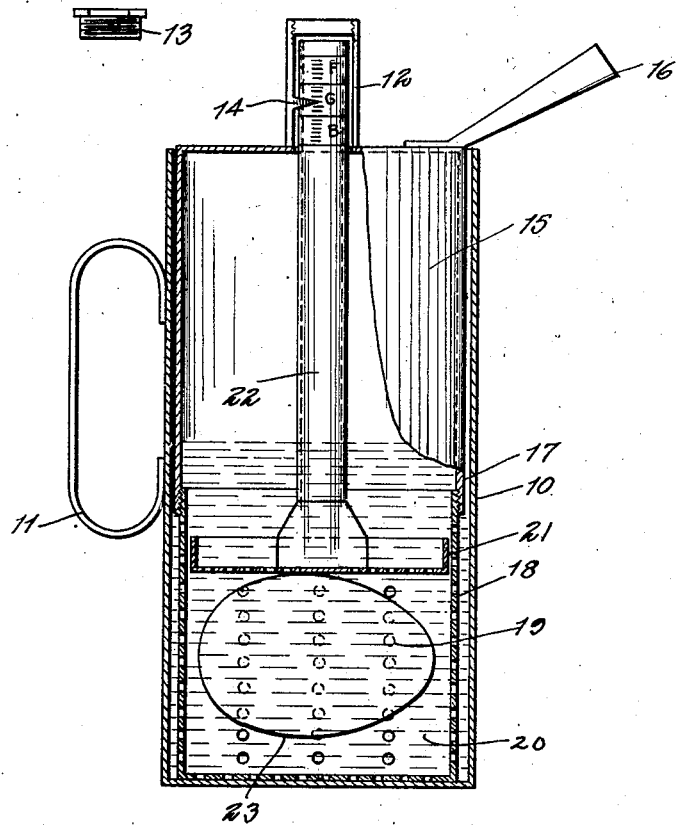
Joseph Pampe, Inventor Patented May 27, 1930

1,760,658

UNITED STATES PATENT OFFICE

JOSEPH PAMPE, OF HOMER CITY, PENNSYLVANIA

EGG-TESTING DEVICE

Application filed July 10, 1928, Serial No. 291,572. Renewed April 5, 1930.

This invention relates to improvements in egg testing apparatus, and it is the principal object of my invention to provide an egg tester indicating the quality of an egg immersed into water within a container by means of a scale on the stem of a float operated by the egg, thus an egg of best quality will sink to the bottom of the water container and the float resting thereon will assume its lowermost position in which the scale mark "F" indicating first class quality comes opposite a pointer.

Eggs of good quality but somewhat inferior in quality than first class will float in the water and raise the float to indicate by its scale mark "G" coming opposite the pointer that the egg is of "good quality".

An egg, however, in which gases have developed and which therefore is spoiled, will float on the water and raise the float to its highest position to indicate by its mark "B" coming opposite the pointer, that the egg is of bad quality.

Another object of my invention is the provision of an egg tester of simple and inexpensive construction, yet durable and efficient in its operation.

These and other objects and advantages of my invention will become more fully known, as the description thereof proceeds, and will then be specifically defined in the appended claim.

In the accompanying drawing forming a material part of this disclosure:

Fig. 1 is a sectional side elevation of an egg tester constructed according to my invention.

Fig. 2 is a top plan view thereof.

Fig. 3 is the detail view of a cap.

The apparatus comprises as illustrated, an outer vessel, or container 10 having a handle 11, and an inner container 15 having a centrally located upper neck part 12 closed at its upper end by means of a screw cap 13 or the like, and having a pointer 14 formed with one of its walls. Within the vessel or container 10, an inner casing 15 is provided having an upper handle 16. The inner casing consists of two parts, an upper 17 and a lower 18, attached to the lower end of the upper part by means of a screw thread.

The walls of the lower part 18 are perforated, as at 19, so that water 20 with which the lower part of container 10 is filled may enter part 18 in which a swimmer or float 21 is arranged to float in the water. This float has an upwardly directed median stem 22, the upper end of which enters neck part 12 and is there provided with suitable graduations to indicate by hand 14 the quality of the egg 23 to be tested and introduced into the water container 18. The operation of my device will be entirely clear. If a good egg is placed into chamber 18 it will sink to the bottom thereof and the float resting thereon by its own weight will assume its lowermost position to indicate by the pointer on the scale or mark at the upper end of its stem, marked "F" that the egg is of first class quality. If the egg is of a still good but inferior quality it will float at a certain distance above bottom of vessel 18 and its scale mark "G" will come opposite the pointer and so indicate that the egg is still good. If however, the gas development within the egg has progressed to a degree where the egg is floating on the water, the float resting thereon will indicate by its scale mark B coming in alignment with the pointer and show that the egg is bad or spoiled.

It is to be understood that I may make such changes in my apparatus as come within the scope of the appended claim without departure from my invention.

Having thus described my invention, which I claim as new, and desire to secure by Letters Patent is:—

An egg tester of the class described comprising a pair of water containing vessels one within the other, the inner vessel composed of two parts screwed together and having perforated walls in one of its parts adapted to receive an egg, handles for said outer and said inner vessels, a neck part on said inner vessel, a pointer thereon, a float in said inner vessel normally resting by its own weight upon the egg, a graduated stem on said float adapted to rise with said float to indicate by said pointer the quality of the egg to be tested, an egg of first class quality sinking to the bottom of the inner container, and allowing the graduation of the stem to sink to its lowest level, with the indication "F" coming opposite the pointer, an egg of good quality floating near the bottom of the inner container to raise said float and its graduated stem to bring the indication "G" opposite the egg to be of good quality, an egg of inferior quality with gas development raising to a higher level in the lower inner container and lifting the float and its stem to bring its legend "B" opposite the pointer for indicating the inferior quality of the egg.

Signed at Homer City, in the county of Indiana and State of Pennsylvania this 26th day of June, A. D. 1928.

JOSEPH PAMPE.